US011886181B2

(12) United States Patent
Cooper et al.

(10) Patent No.: US 11,886,181 B2
(45) Date of Patent: Jan. 30, 2024

(54) PREDICTING THE LIFE OF CONSUMABLE COMPONENTS

(71) Applicant: Airbus Operations Limited, Bristol (GB)

(72) Inventors: Jonathan Cooper, Bristol (GB); Matthew Gadd, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 17/762,620

(22) PCT Filed: Sep. 16, 2020

(86) PCT No.: PCT/EP2020/075864
§ 371 (c)(1),
(2) Date: Mar. 22, 2022

(87) PCT Pub. No.: WO2021/058349
PCT Pub. Date: Apr. 1, 2021

(65) Prior Publication Data
US 2022/0350325 A1 Nov. 3, 2022

(30) Foreign Application Priority Data
Sep. 23, 2019 (GB) .................................. 1913664

(51) Int. Cl.
*G05B 23/02* (2006.01)
*B60C 11/24* (2006.01)
(Continued)

(52) U.S. Cl.
CPC ........ *G05B 23/0283* (2013.01); *B60C 11/243* (2013.01); *B60C 11/246* (2013.01);
(Continued)

(58) Field of Classification Search
CPC ............ G05B 23/0283; G05B 23/0284; B60C 11/243; B60C 11/246; B60C 200/02;
(Continued)

(56) References Cited

U.S. PATENT DOCUMENTS 6,983,648 B2 1/2006 Grout
2009/0210278 A1 8/2009 Kamisuwa et al.
(Continued)

FOREIGN PATENT DOCUMENTS

EP 1 307 375 5/2003
EP 3457243 3/2019
(Continued)

OTHER PUBLICATIONS

International Search Report and Written Opinion of the ISA for PCT/EP2020/075864, dated Oct. 13, 2020, 11 pages.
(Continued)

*Primary Examiner* — Manuel L Barbee
(74) *Attorney, Agent, or Firm* — Nixon & Vanderhye P.C.

(57) ABSTRACT

A component life prediction system configured to predict the remaining life of a consumable component installed on an aircraft. The system includes a processor configured to: receive wear information indicative of a current wear state of the component; receive schedule information indicative of a future flight schedule for the aircraft; and determine the remaining life of the component based on the received wear information and the received schedule information.

21 Claims, 2 Drawing Sheets

(51) Int. Cl.
*B60T 17/22* (2006.01)
*B64F 5/60* (2017.01)
*G06Q 10/20* (2023.01)

(52) U.S. Cl.
CPC .............. *B60T 17/221* (2013.01); *B64F 5/60* (2017.01); *G05B 23/024* (2013.01); *G06Q 10/20* (2013.01); *B60C 2200/02* (2013.01); *B60T 2240/03* (2013.01); *B60T 2270/406* (2013.01)

(58) Field of Classification Search
CPC ...... B60T 17/221; B60T 2240/03; B64F 5/60; G06Q 10/20
See application file for complete search history.

(56) References Cited

U.S. PATENT DOCUMENTS

| | | | | |
|---|---|---|---|---|
| 2017/0166328 | A1* | 6/2017 | Ethington | .............. G06Q 10/20 |
| 2018/0290639 | A1* | 10/2018 | Dirgo | ...................... B60T 17/22 |
| 2019/0263374 | A1* | 8/2019 | Bill | ........................ B60T 17/22 |
| 2020/0398975 | A1 | 12/2020 | Toda et al. | |

FOREIGN PATENT DOCUMENTS

| | | |
|---|---|---|
| EP | 3530532 | 8/2019 |
| WO | 02/12043 | 2/2002 |
| WO | 2019116782 | 6/2019 |

OTHER PUBLICATIONS

GB 1913664.7, Search and Examination Report, dated Mar. 10, 2020 (8 pages).

\* cited by examiner

PREDICTING THE LIFE OF CONSUMABLE COMPONENTS

This application is the U.S. national phase of International Application No. PCT/EP2020/075864, filed Sep. 16, 2020, which designated the U.S. and claims priority to United Kingdom patent application GB 1913664.7, filed Sep. 23, 2019, the entire contents of each of which are hereby incorporated by reference.

TECHNICAL FIELD

The present invention relates to a component life prediction system for predicting the remaining life of a consumable component installed on an aircraft, an aircraft comprising such a system, and a method of predicting the remaining service life of a consumable aircraft component.

BACKGROUND

Managing replacement consumable components, such as brake packs and tyres, is challenging for aircraft operators. In the case of brake packs, an airline may lease these from a brake manufacturer and will incur extra cost if a brake pack is returned without being sufficiently worn. On the other hand, using excessively worn brake packs must be avoided. Currently, relatively simplistic models are used to predict when a brake pack will need replacing, along with manual checks of brake wear pins. These methods are not very accurate, making it difficult for the airline to plan in advance when to replace a brake pack. Similar challenges exist in respect of other consumable aircraft components.

SUMMARY

A first aspect of the present invention provides a component life prediction system configured to predict the remaining life of a consumable component installed on an aircraft. The system comprises a processor configured to: receive wear information indicative of a current wear state of the component; receive schedule information indicative of a future flight schedule for the aircraft; and determine the remaining life of the component based on the received wear information and the received schedule information.

Optionally, the received wear information comprises the output of a wear model configured to estimate a current wear state of the component.

Optionally, the received wear information comprises sensor data generated by a wear sensor configured to measure the current wear state of the component. Optionally, the received wear information comprises a measurement of one or more physical attributes of the component.

Optionally, the received schedule information comprises a plurality of primary schedule parameters, the primary schedule parameters comprising one or more of: airline operating the aircraft, departure airport, arrival airport, route, aircraft serial number arrival gate, departure gate, arrival time, departure time, arrival date, departure date.

Optionally, the received schedule information covers at least 15 future flight cycles of the aircraft.

Optionally, the processor is configured to derive one or more secondary schedule parameters based on the received schedule information. The one or more secondary schedule parameters may comprise any one or more of: flight duration, departure time of day, departure day of the week, departure week of the month.

Optionally, the processor is configured to use a machine learning algorithm to determine the remaining life of the component. Optionally, the machine learning algorithm is a supervised machine learning algorithm.

Optionally, the machine learning algorithm has been trained using historical wear information indicative of a wear state of the component over a historical time period and historical schedule information indicative of the flight schedule of the aircraft during the historical time period.

Optionally, the machine learning algorithm has been trained using historical wear information indicative of a wear state of a different component over a historical time period and/or historical schedule information indicative of the flight schedule of a different aircraft during the historical time period The different component has the same design as the component and the different aircraft has the same design as the aircraft.

Optionally, the machine learning algorithm has been additionally trained using one or more of: historical in-service information comprising data generated by the aircraft during its operation over a historical time period or data derived from data generated by the aircraft during its operation over the historical time period; historical flight-tracking information; airport information comprising parameters of one or more airports used by the aircraft; historical weather information.

Optionally, each type of historical information comprises a plurality of sets of parameters, each set corresponding to a historical flight cycle of the aircraft.

Optionally, the processor is configured to receive wear information relating to each of multiple consumable components installed on the aircraft, and to determine the remaining life of each of the multiple components.

Optionally, the processor is configured to output the determined remaining life as a number of flight cycles.

Optionally, the processor is further configured to determine a time for replacement of the component based on the determined remaining life and the received schedule information.

Optionally, the component is a brake pack.
Optionally, the component is a tyre.

A second aspect of the present invention provides a method of predicting the remaining service life of a consumable aircraft component. The method comprises:
receiving wear data relating to a current wear state of the consumable aircraft component;
receiving flight schedule data relating to planned flights of an aircraft comprising the consumable aircraft component; and
estimating the remaining service life of the consumable aircraft component, based on the received wear data and the received flight schedule data.

A third aspect of the present invention provides an aircraft comprising a consumable component and a component life prediction system according to the first aspect configured to predict the remaining life of the consumable component.

Optionally, the aircraft further comprising a wear sensor configured to measure a current wear state of the consumable component and to provide wear information indicative of a current wear state of the component to the component life prediction system.

Optionally, the processor of the component life prediction system is configured to perform the method of the second aspect.

BRIEF DESCRIPTION OF THE DRAWINGS

Embodiments of the invention will now be described, by way of example only, with reference to the accompanying drawings, in which.

DETAILED DESCRIPTION

The examples described herein relate to systems and methods for predicting the remaining life of consumable aircraft components. In each example, the prediction is based on information about the current wear state of a consumable component, as well as on information about the future flight schedule of an aircraft on which that consumable component is installed.

Figure 1:
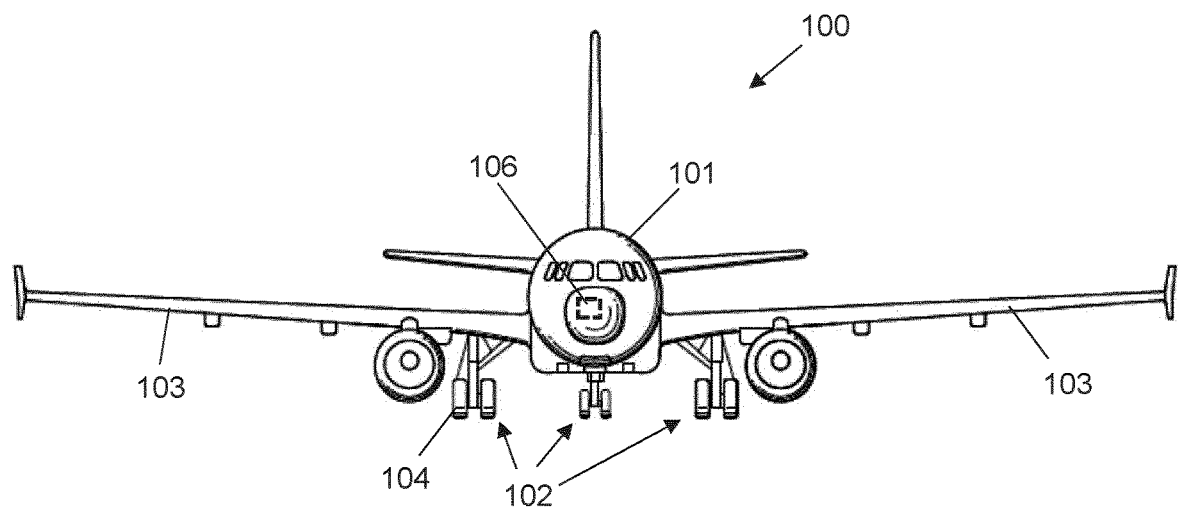
FIG. 1 is a front view of an example aircraft comprising a system according to the invention.

FIG. 1 is a simplified schematic view of an aircraft 100. The aircraft 100 comprises a fuselage 101, a pair of wings 103, and a plurality of landing gear assemblies 102. The landing gear assemblies 102 may include main and nose landing gears that may be extended during take-off and landing. Each landing gear assembly 102 includes wheels such as wheel 104. The aircraft 100 comprises a computing system 106 which may, for example, comprise one or more processors and one or more computer readable storage media. The aircraft 100 may also comprise instruments or sensors for measuring characteristics or parameters related to the aircraft, and instruments or sensors for measuring environmental characteristics, which may be distributed at various different locations on the aircraft 100. The aircraft 100 may also comprise indicating devices for providing various indications relating to the aircraft. The indicating devices may include screens which display text and/or graphics, dials, light indicators, sound indicators which emit sound to provide indications, and the like.

The aircraft 100 comprises various consumable components. The term "consumable component" is intended to mean a component which is expected to be replaced at least once, and typically many times, during the service life of the aircraft 100. For example, each wheel of the aircraft 100 may comprise a brake pack and a tyre. Each brake pack and tyre of the aircraft is a consumable component. Various other consumable components may be comprised in the aircraft 100.

Figure 2:
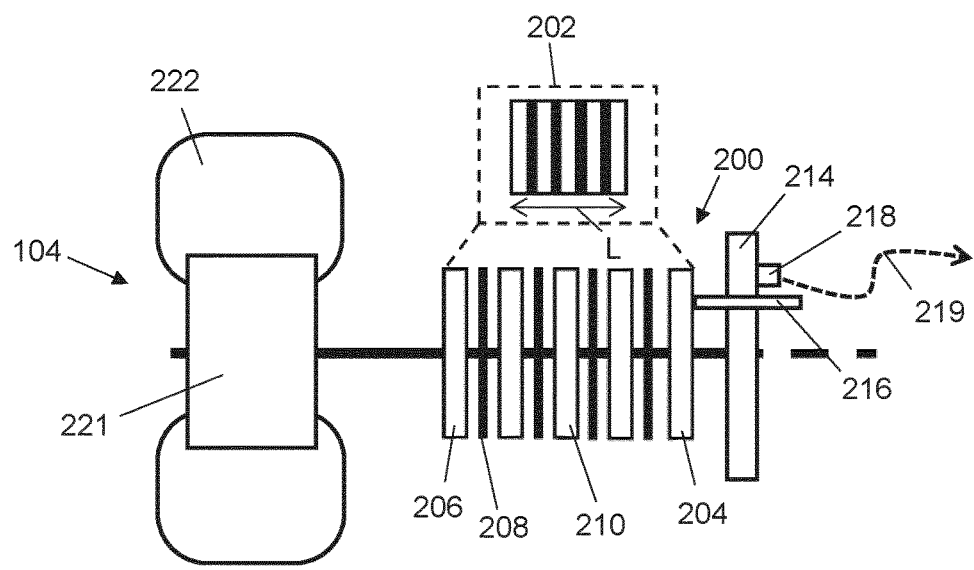
FIG. 2 is a schematic diagram depicting an example aircraft wheel brake and a wheel of an example aircraft landing gear.

FIG. 2 is a simplified schematic view of the aircraft wheel 104 of the aircraft 100, together with a brake pack 200 which is associated with that wheel 104. Each of the wheels of at least the main landing gear assemblies of the aircraft 100 has a brake pack such as the brake pack 200 associated with it. The wheel 104 comprises a hub 221 and a tyre 222. Each other wheel of the aircraft 100 also comprises a hub and a tyre.

The brake pack 200 is configured to apply a braking force to inhibit the rotation of the wheel 104. The example brake pack 200 comprises a housing 214 and a plurality of brake discs including a pressure plate 204, a reaction plate 206, and a number of rotors and stators such as the rotor 208 and the stator 210. In this example, the brake discs 202 include a plurality of rotors and stators, and the brake assembly in which the brake pack 200 is comprised is therefore a multiple disc brake. In other examples, the brake pack 200 may not comprise multiple rotors and stators. The type of brake pack used in a particular example aircraft landing gear will depend on the characteristics of the aircraft in question, such as size, carrying capacity and the like.

When the aircraft 100 travels along the ground supported by the landing gear 102, the rotors rotate with the wheel 104, whereas the stators, the pressure plate 204 and the reaction plate 206 do not rotate with the wheel 104. When braking is applied, the pressure plate 204 is urged towards the reaction plate 206 so that the brake discs 202 come into contact with one another (as shown in the top box in FIG. 2) and friction acts to inhibit the rotational motion of the rotors, thus generating a braking force to reduce the speed of the aircraft 100. The brake pack 200 may be hydraulically actuated or electrically actuated.

Any one or more of the rotors, stators, pressure plate 204 and reaction plate 206 may be composed of Carbon-Carbon (CC) composites. During use, the brake discs 202 (and all other brake discs of the aircraft 100) may lose material, for example as a result of friction. Catalytic oxidation and/or thermal oxidation of the brake discs may occur and may affect the rate at which the brake discs 202 lose material. Loss of brake material during normal operation of the brakes is referred to as "brake wear". Brake wear causes the length L of the brake discs 202 to decrease, therefore the wear state of the brake pack 200 may be determined by measuring, directly or indirectly, the length L. The brake pack should be replaced before a wear state of the brake pack 200 exceeds a maximum acceptable value.

On most commercial airliners a current wear state of each brake pack is assessed before each flight by a manual inspection of a wear pin comprised in the brake pack. The length of the wear pin correlates with the current wear state of the brake pack. The illustrated brake pack 200 comprises such a wear pin 216. The wear pin 216 is mounted to a surface of the pressure plate 204 such that it moves with the pressure plate 204 when braking pressure is applied. The wear pin 216 passes through an opening in the housing 214, and the length of the wear pin 216 is configured such that an end of the wear pin 216 being flush with the surface of the housing 214 when braking pressure is applied means that the brake pack 200 is fully worn and should be replaced.

In some examples the aircraft 100 may comprise a brake wear sensor for automatically measuring a current wear state of the brake pack 200. In the illustrated example, the brake pack 200 comprises such a wear sensor in the form of a "digital wear pin". The digital wear pin comprises a sensor 218 configured to measure the length of the portion of the wear pin 216 which extends from the surface of the housing 214 when braking pressure is applied. The sensor 218 is configured to transmit measurement data to a component life prediction system via a communications link 219 (which may be wired or wireless) by any suitable means. The sensor 218 may comprise any known type of sensor suitable for measuring the length of the protruding portion of the wear pin 216. In other examples, the aircraft 100 may comprise a wear sensor which measures brake wear according to a different principle, such as directly measuring the position of the pressure plate. In some examples the aircraft 100 may not comprise any form of brake wear sensor.

The tyre 222 (and each other tyre on the aircraft 100) will also experience loss of material during operation of the aircraft 100, for example due to friction between the tyre surface and the ground. Loss of tyre material due to normal wear and tear is referred to as "tyre wear". The tyre 222 should be replaced before a wear state of the tyre 222 exceeds a maximum acceptable value. The wear state of the tyre 222 may be determined by measuring a tread depth of the tyre 222. This is typically done manually, before each flight of the aircraft 100. However; in some examples the aircraft 100 may comprise a sensor configured to automatically measure tyre wear, for example by directly or indirectly measuring the tread depth by any suitable means. Such a sensor may transmit measurement data to a component life prediction system.

Figure 3:
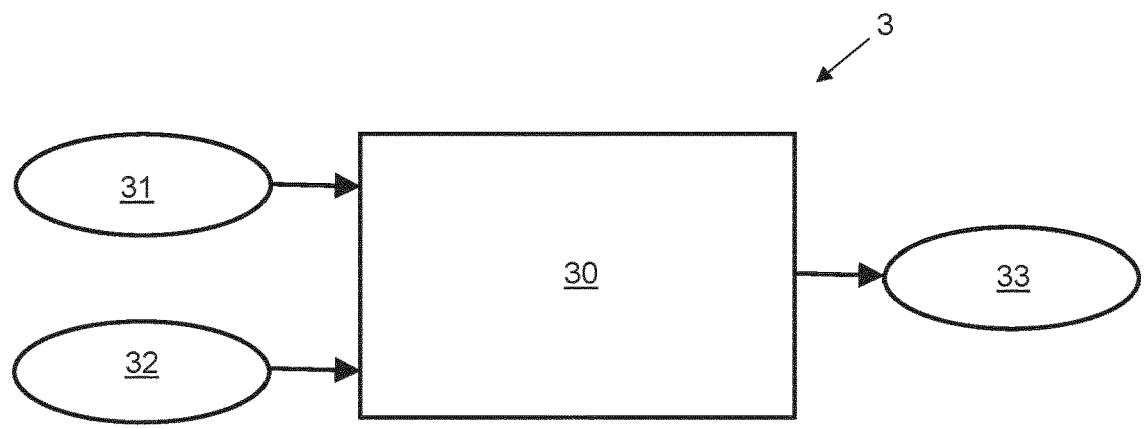
FIG. 3 is a schematic block diagram of an example system according to the invention.

The aircraft 100 further comprises a component life prediction system according to the invention, which is configured to predict the remaining life of one or more of the consumable components that are installed on the aircraft 100. FIG. 3 shows an example component life prediction system 3 according to the invention. The consumable component for which the system 3 predicts the remaining life may be, for example, the brake pack 200, the tyre 222, any other brake pack or tyre of the aircraft 100, or any other consumable component of the aircraft 100 which experiences an amount of wear that is dependent on the manner in which the aircraft 100 is operated. The system 3 comprises a processor 30 which is configured to receive wear information 31 and schedule information 32, and to determine the remaining life of the component based on the received wear information 31 and schedule information 32. The processor 30 may output a determination 33 of the remaining life of the component.

The wear information 31 is indicative of a current wear state of the consumable component for which a life prediction is to be generated. The wear information 31 may indicate the wear state of the consumable component at the end of the most recent complete flight cycle of the aircraft (a flight cycle is considered to begin with pushback from the gate and end when the aircraft is once again at a gate following landing). In some examples the wear information 31 comprises measurement data, such as a measured value of at least one parameter that is correlated in a known manner with the wear state of the consumable component. The received wear information may comprise a measurement of one or more physical attributes of the component. If the consumable component is a brake pack, for example, then the wear information may comprise a measured value of the length of a wear pin, or a measured value of the length L of the brake discs. The measurement may be performed automatically by a wear sensor, such as the wear sensor 218, and transmitted to the processor 30 via a communications link. In such examples the processor 30 may receive the wear information 31 directly from the wear sensor or it may retrieve the wear information from a computer readable storage medium. In other examples the measurement may be performed manually by ground crew and the measurement values may be input to the processor 30 via a user interface.

In other examples, the wear information 31 does not comprise measurement data, but instead comprises an output value generated by a wear model configured to estimate a current wear state of the component. The details of how such a model would operate are outside the scope of the current invention and will therefore not be discussed in detail. However; generally a suitable wear model would be expected to operate by receiving relevant inputs relating to a usage of the component (for brake wear these might include brake temperature, braking energy, brake mass, braking torque, or the like) and calculating an updated current wear value based on a set of pre-defined rules linking these inputs to wear of the component. The wear model may be comprised in a different system of the aircraft 100 to the component life prediction system 3, in which case that different system would be connected to the processor 30 by a communications link to facilitate sending the wear information to the processor 30. The wear model may be comprised in a system remote from the aircraft, in which case such a system will comprise a suitable communications interface for sending the wear information 31 to the processor 30. Alternatively the processor 30 may retrieve the model output values from a computer readable storage medium.

The wear information 31 may be received by the processor 30 at one or more discrete times during a flight cycle of the aircraft 100. For example, the wear information 31 may be received by the processor at the end of each flight cycle. However; other examples are possible in which the processor 30 continuously receives wear information 31.

The received schedule information 32 is indicative of a future flight schedule for the aircraft 100. The schedule information 32 may cover at least 15 future flight cycles of the aircraft. The schedule information 32 may cover between 10 and 50 future flight cycles of the aircraft. The number of future flight cycles of the aircraft covered by the schedule information 32 may correspond to at least 2 calendar days. The received schedule information comprises a plurality of primary schedule parameters. The primary schedule parameters comprise one or more of: airline (that is, the airline which is operating the aircraft); departure airport; arrival airport; route; aircraft serial number; arrival gate, departure gate, arrival time, departure time, arrival date, departure date. The schedule information may be provided by a source, such as the airline operating the aircraft 100. Updated schedule information may be received from the source periodically, by any suitable means, and stored on a computer readable storage medium accessible by the controller 30. In some examples the controller 30 may be configured to retrieve the schedule information 32 prior to each new remaining life determination.

The processor 30 may be located in an avionics bay of the aircraft 100. It may form part of the computing system 106. Alternatively, the processor 30 may be located remotely from the aircraft 100. In examples in which the processor 30 is offboard the aircraft and the wear information is generated by a sensor onboard the aircraft 100 (for example the wear sensor 218), the processor 30 is provided with a suitable communications interface for receiving the wear information 31 from the wear sensor. The processor 30 may be in communication with any or all of: one or more computer readable storage media, one or more sensors, one or more output devices, and/or one or more other aircraft systems, as required for the processor 30 to receive the wear information 31, receive the schedule information 32, and (optionally) output a determination of the remaining life of the consumable component.

In some examples the processor 30 is configured to derive one or more secondary schedule parameters based on the received schedule information. Such derived secondary schedule parameters may include, for example, any one or more of: flight duration, departure time of day, departure day of the week, departure week of the month. Each secondary schedule parameter may be derived based on one or more primary schedule parameters comprised in the received schedule information. A secondary schedule parameter may be any parameter which it is possible to derive from one or more of the primary schedule parameters and which could conceivably affect or correlate with wear of the consumable component. The processor 30 may use any suitable computational technique known in the art to derive the one or more secondary schedule parameters.

The processor 30 is configured to use a machine learning algorithm to determine the remaining life of the consumable component. Machine learning is a form of data analysis in which a model is automatically created by an algorithm, based on the algorithm identifying patterns in training data without being given any explicit instructions. Machine learning algorithms may be supervised, meaning that the algorithm is configured to infer a function from training data comprising labelled example input-output pairs, or unsupervised, meaning that the algorithm is configured to find previously unknown patterns in an unlabelled data set. The machine learning algorithm used by component life prediction systems according to the invention is a supervised machine learning algorithm.

The machine learning algorithm implemented by the processor 30 has been trained using historical wear information indicative of a wear state of a consumable component over a historical time period, and historical schedule information indicative of a flight schedule of an aircraft on which that consumable component was installed during the historical time period. The historical time period may end at the current time. The historical time period may end at the completion of the last flight cycle of the aircraft to which the historical information relates. The historical time period may begin at a time when the consumable component to which the historical wear information relates (this may be, but need not be, the consumable component for which a life prediction is to be generated (hereinafter referred to as the "consumable component of interest")) was installed on the aircraft to which the historical schedule information relates (this may be, but need not be, the aircraft 100 on which the consumable component of interest is installed). The historical time period may begin at a time between the current time and the time when the consumable component to which the historical wear information relates was installed on the aircraft to which the historical schedule information relates.

The historical wear information used to train the machine learning algorithm may relate to the consumable component of interest. That is, the historical wear information may comprise measurements indicative of the wear state of the consumable component of interest at times preceding the current time. Alternatively or additionally, the historical wear information used to train the machine learning algorithm may relate to a different consumable component which has the same design as the consumable component of interest. That is, the historical wear information may comprise measurements indicative of the wear state of the different consumable component at times preceding the current time. The different consumable component may be installed on the aircraft 100, or it may be installed on a different aircraft of the same design as the aircraft 100. The historical wear information may relate to multiple different consumable components and the historical schedule information may relate to multiple different aircraft.

The historical schedule information may comprise primary schedule parameters and/or secondary schedule parameters. It may be advantageous for the historical schedule information to comprise both primary and secondary schedule parameters. The historical schedule information may relate to the aircraft 100 on which the consumable component of interest is installed. Alternatively or additionally, the historical schedule information may relate to a different aircraft of the same design as the aircraft 100. In examples where some or all of the historical wear information relates to a consumable component different to the consumable component of interest, which is installed on a different aircraft to the aircraft 100 on which the consumable component of interest is installed, at least some of the historical schedule information relates to the different aircraft on which the different consumable component is installed.

The historical schedule information may comprise out-of-date received schedule information (that is, schedule information that was received by the system 3 at a time prior to the aircraft 100 operating the flights covered by the historical schedule information). Alternatively, the historical schedule information may be obtained from a different source to the received schedule information. For example, the received schedule information may be provided by the airline operating the aircraft whereas the historical schedule information may be obtained from a flight-tracking service such as Flight Radar 24. It may be preferable to obtain the historical schedule information from a flight-tracking service because the flights actually operated by an aircraft may deviate from the flights that were scheduled for that aircraft.

In addition to the historical wear information and the historical schedule information, the machine learning algorithm may be trained using one or more of: historical in-service information; historical flight-tracking information; airport information; historical weather information. Each type of historical information comprises a plurality of sets of parameters, where each set of parameters corresponds to a historical flight cycle of the aircraft. Typically, at least some of the historical information used to train the machine learning algorithm may not be received from the source in a format in which it is divided into flight cycles. For example, some types of historical information may be received from the source as a time series of values. For such information types, a processor (which may be the processor 30, or a different processor) divides the received historical information into flight cycles prior to inputting it to the machine learning algorithm. Historical information used to train the machine learning algorithm may, in some examples, be stored on a computer readable storage medium accessible by the processor 30.

Historical in-service information comprises data generated by the aircraft 100 (and/or by the different aircraft) during its operation over the historical time period, and/or information derived from such data. Historical in-service information may comprise one or more parameters relating to the operation of the aircraft 100 (or the different aircraft), such as the distance taxied by the aircraft 100 (or the different aircraft) during each flight cycle, and the number of turns performed during taxiing during each flight cycle. The in-service parameters which are most useful for training the machine learning algorithm may not be explicitly recorded by the aircraft systems during operation, but may be derivable from parameters which are recorded. In such cases one or more of the parameters comprised in the historical in-service information are derived, by the processor 30 using any suitable computational technique, from other of the parameters comprised in the historical in-service information.

Historical flight-tracking information comprises data originating from a flight-tracking service, such as Flight Radar 24, and/or information derived from such data. Flight-tracking services record various parameters relating to aircraft flights, such as origin and destination airports, flight number, aircraft type and serial number, airline, aircraft positions, altitudes, headings and speeds. Some of these parameters are equivalent to parameters comprised in the received schedule information. Flight-tracking information may therefore be used as a source of historical schedule information, as discussed above. However, flight-tracking information also comprises parameters not comprised in the schedule information. Such parameters may be used to train the machine learning algorithm, in addition to the historical schedule information, and it is these parameters unique to flight-tracking information that are intended to be denoted by the term "historical flight-tracking information" as used herein. The flight-tracking parameters which are most useful for training the machine learning algorithm may not be explicitly recorded by the flight-tracking service, but may be derivable from parameters which are recorded. Examples of parameters derivable from flight-tracking information which may be useful for training the machine learning algorithm include average number of flights per day of the aircraft, and average turnaround time of the aircraft.

The airport information comprises parameters relating to one or more airports used by the aircraft 100 (or the different aircraft), and which could affect or correlate with wear of the consumable component. For example, the airport information may comprise one or more of: runway landing distance; runway take-off length; runway elevation; runway width; runway surface type; runway slope. The airport information may be stored on a machine readable storage medium accessible by the processor 30. The airport information may be updated periodically, in which case the training of the machine learning algorithm will also need to be updated to account for any changes in the airport information.

Optionally, historical weather information may also be used to train the machine learning algorithm. Such historical weather information comprises weather data recorded during each flight cycle comprised in the historical time period. The weather data may include values for a variety of parameters, such as temperature, humidity, atmospheric pressure, precipitation state, or any other weather-related parameter. In examples in which the machine learning algorithm has been trained using historical weather information, the component life prediction system 3 may be configured to additionally receive weather information comprising predicted weather parameters for the time period covered by the received schedule information 32, and to base the determination 33 of the remaining life of the consumable component additionally on the received weather information.

The manner in which the wear state of a consumable component such as the tyre 222 or the brake pack 200 changes is dependent on various factors, such as the design of the consumable component, the design of the aircraft, the number of brake applications during taxiing, the number of turns during taxiing, the length of the runway used for a landing, how heavily loaded the aircraft is, whether the runway is wet or dry, the ambient temperature, and so on. The historical data described above which is used to train the machine learning algorithm comprises parameters which could conceivably affect or be correlated with the wear state of the consumable component. The particular types of historical data used to train the machine learning algorithm is therefore tailored in dependence on the type of the consumable component for which a life prediction is to be generated. The particular types of historical and airport information described above are expected to be relevant to the wear state of an aircraft brake, but will also be relevant to various other consumable aircraft components, particularly those comprised in the landing gear 102 of the aircraft 100.

During the training process, the machine learning algorithm will have "learnt" associations between the various parameters included in the information used to train it, such that it became able to generate a life prediction for the consumable component of interest based on current wear data for that consumable component and current schedule data for the aircraft 100 on which the consumable component of interest is installed. According to the nature of machine learning algorithms, the details of these learned associations and the manner in which the prediction is generated remain opaque to the operator.

Thus, the processor 30 determining the remaining life of the component based on the received wear information 31 and received schedule information 32 comprises the machine learning algorithm operating on the received wear information 31 and received schedule information 32 to generate the determination 33 of the remaining life of the component. The remaining life determination 33 output by the machine learning algorithm may comprise a remaining number of flight cycles for which the consumable component can be used, in accordance with the received schedule information 32, before it requires replacement. The component life prediction system 3 may be configured to send the determination 33, in any suitable format, to a further system of the aircraft such as a display device or an indicating device.

In some examples the processor 30 is configured to determine a time for replacement of the consumable component based on the determined remaining life and the received schedule information. The determined time may be, for example, a calendar date and/or time. The determined time may be an interval between scheduled flights of the aircraft 100. The determined time may be a time at which the aircraft is scheduled to be in a location at which replacement of the consumable component can be easily performed. The determined time may be before a time at which the consumable component is predicted to become fully worn. Preferably the determined time for replacement of the consumable component is as close as possible to a time at which the consumable component is predicted to become fully worn.

In some examples the processor 30 is configured to determine the remaining life of each of multiple consumable components installed on the aircraft 100. In such examples, the multiple consumable components may be of the same type—for example each brake pack of the aircraft 100. Alternatively, the multiple consumable components may comprise components of different types—for example one or more brake packs and one or more tyres. In examples where the processor 30 is configured to determine the remaining life of each of multiple consumable components, the processor 30 is configured to receive wear information relating to each of the multiple consumable components. Where the multiple consumable components comprise components of different types, the machine learning algorithm may be trained separately (using different training information) in respect of each component type. Alternatively, the processor 30 may comprise a separate machine learning algorithm in respect of each component type.

Figure 4:
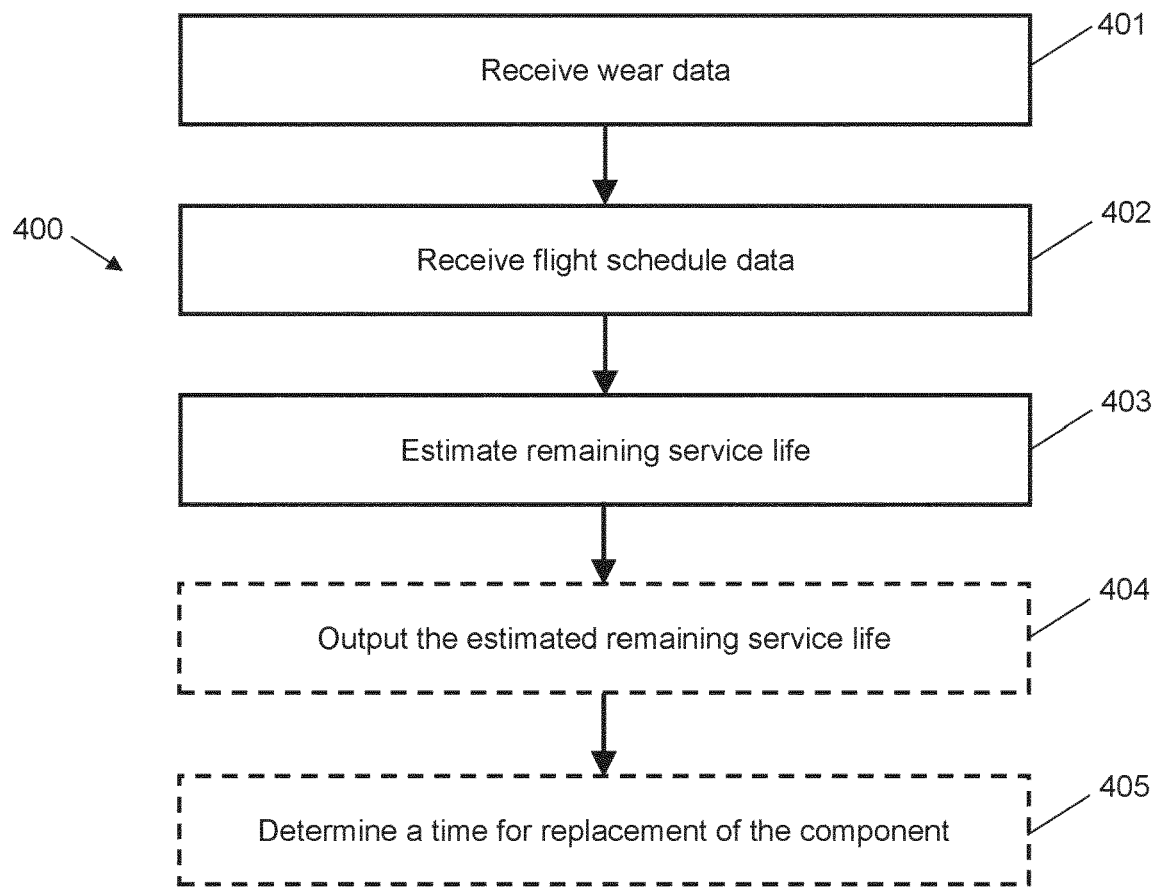
FIG. 4 is a flow chart illustrating an example method according to the invention.

FIG. 4 is a flow chart illustrating an example method 400 of predicting the remaining service life of a consumable aircraft component. The consumable aircraft component may be any of the example consumable components discussed above. The method may be implemented by a component life prediction system, such as the example component life prediction system 3 described above.

A first block 401 of the method 400 comprises receiving wear data relating to a current wear state of the consumable aircraft component. The wear data may have any of the features discussed above in relation to the example wear data 31, and may be received in an equivalent manner. A second block 402 of the method 400 comprises receiving flight schedule data relating to planned flights of an aircraft comprising the consumable aircraft component. The flight schedule data may have any of the features discussed above in relation to the example schedule data 32, and may be received in an equivalent manner. Blocks 401 and 402 may be performed by a processor of a component life prediction system, such as the example processor 30. Blocks 401 and 402 may (but need not) be performed simultaneously.

In a third block 403, the remaining service life of the consumable aircraft component is estimated, based on the received wear data and the received flight schedule data. The estimation may be performed by a processor, for example in the manner described above in relation to the operation of the example component life prediction system 3. The estimation may be performed using a machine learning algorithm.

The method 400 may further comprise any one, both, or neither of two optional blocks 404 and 405.

In optional block 404, the estimated remaining service life (that is, the estimate generated as a result of performing block 403) is output. Outputting the estimated remaining service life may comprise a processor which performed the estimation sending a signal to a further system or device. Such a signal may be configured, for example, to cause the further system or device to display or otherwise indicate the estimated remaining service life. Alternatively or additionally, the signal may be configured to be used by the further system or device as an input to a further process (such as a process of determining an optimum time to replace the consumable component). The outputting may be done using any suitable techniques known in the art.

In optional block 405, a time for replacement of the component is determined. The time for replacement may be determined by the same processor that performed block 403, or it may be performed by a different processor or system. The determination of the time for replacement may be based on the estimated remaining service life and on the received schedule data. The time for replacement may be determined, for example, in the manner described above in relation to the operation of the example component life prediction system 3.

Although the invention has been described above with reference to one or more preferred examples or embodiments, it will be appreciated that various changes or modifications may be made without departing from the scope of the invention as defined in the appended claims.

Although the invention has been described above mainly in the context of a fixed-wing aircraft application, it may also be advantageously applied to various other applications, including but not limited to applications on vehicles such as helicopters, drones, trains, automobiles and spacecraft.

Where the term "or" has been used in the preceding description, this term should be understood to mean "and/or", except where explicitly stated otherwise.

The invention claimed is:

1. A component life prediction system configured to predict a remaining life of a consumable component installed on an aircraft, the system comprising:
a processor configured to:
receive wear information indicative of a current wear state of the consumable component;
receive schedule information indicative of a future flight schedule for the aircraft; wherein the future flight schedule includes a plurality of future flight cycles of the aircraft and the schedule information includes a departure airport and an arrival airport for each of the future flight cycles, and
determine the remaining life of the consumable component based on the received wear information and the received schedule information.

2. The component life prediction system according to claim 1, wherein the received wear information comprises an output of a wear model configured to estimate a current wear state of the consumable component.

3. The component life prediction system according to claim 1, wherein the received wear information comprises sensor data generated by a wear sensor configured to measure the current wear state of the consumable component.

4. The component life prediction system according to claim 3, wherein the received wear information comprises a measurement of one or more physical attributes of the consumable component.

5. The component life prediction system according to claim 1, wherein the received schedule information comprises a plurality of primary schedule parameters, and the primary schedule parameters comprise one or more of: the departure airport, the arrival airport, airline operating the aircraft, route between the departure and the arrival airports, serial number of the aircraft, arrival gate at the arrival airport, departure gate at the departure airport, arrival time, departure time, arrival date, and departure date.

6. The component life prediction system according to claim 1, wherein the plurality of future flight cycles includes at least fifteen future flight cycles of the aircraft.

7. The component life prediction system according to claim 1, wherein the processor is configured to use a machine learning algorithm to determine the remaining life of the consumable component.

8. The component life prediction system according to claim 7, wherein the machine learning algorithm is a supervised machine learning algorithm.

9. The component life prediction system according to claim 8, wherein the machine learning algorithm has been additionally trained using one or more of:
historical in-service information comprising data generated by the aircraft during its operation over a historical time period or data derived from data generated by the aircraft during its operation over the historical time period;
historical flight-tracking information; airport information comprising parameters of one or more airports used by the aircraft; and
historical weather information.

10. The component life prediction system according to claim 7, wherein the machine learning algorithm has been trained using historical wear information indicative of a wear state of the consumable component over a historical time period and historical schedule information indicative of the flight schedule of the aircraft during the historical time period.

11. The component life prediction system according to claim 7, wherein the machine learning algorithm has been trained using historical wear information indicative of a wear state of a different consumable component over a historical time period and/or historical schedule information indicative of the flight schedule of a different aircraft during the historical time period, the different consumable component having a design the same as the consumable component and the different aircraft having a design the same as the aircraft.

12. The component life prediction system according to claim 1, wherein the processor is configured to receive wear information relating to each of multiple consumable components installed on the aircraft, and to determine the remaining life of each of the multiple consumable components.

13. The component life prediction system according to claim 1, wherein the processor is configured to output the determined remaining life as a number of flight cycles.

14. The component life prediction system according to claim 1, wherein the processor is further configured to determine a time for replacement of the consumable component based on the determined remaining life and the received schedule information.

15. The component life prediction system according to claim 1, wherein the consumable component is a brake pack.

16. The component life prediction system according to claim 1, wherein the consumable component is a tire.

17. An aircraft comprising a consumable component and the component life prediction system of claim 1, configured to predict the remaining life of the consumable component.

18. The aircraft according to claim 17, further comprising a wear sensor configured to measure a current wear state of the consumable component and to provide wear information indicative of a current wear state of the consumable component to the component life prediction system.

19. A component life prediction system configured to predict a remaining life of a consumable component installed on an aircraft, the system comprising:
a processor configured to:
 receive wear information indicative of a current wear state of the consumable component;
 receive schedule information indicative of a future flight schedule for the aircraft;
 determine the remaining life of the consumable component based on the received wear information and the received schedule information, and
 derive one or more secondary schedule parameters based on the received schedule information, wherein the one or more secondary schedule parameters comprises any one or more of: flight duration, departure time of day, departure day of the week, and departure week of the month.

20. A component life prediction system configured to predict a remaining life of a consumable component installed on an aircraft, the system comprising:
a processor configured to:
 receive wear information indicative of a current wear state of the consumable component;
 receive schedule information indicative of a future flight schedule for the aircraft; and
 determine the remaining life of the consumable component using a machine learning algorithm which receives as inputs the received wear information and the received schedule information,
wherein the machine learning algorithm has been trained using historical wear information indicative of a wear state of the consumable component over a historical time period and historical schedule information indicative of the flight schedule of the aircraft during the historical time period, and each type of the historical information comprises a plurality of sets of parameters, each set of the parameters corresponding to a historical flight cycle of the aircraft.

21. A method of predicting the remaining service life of a consumable aircraft component, the method comprising:
 receiving wear data relating to a current wear state of the consumable aircraft component;
 receiving flight schedule data relating to planned flights of an aircraft comprising the consumable aircraft component, wherein the flight scheduling data includes a departure airport and an arrival airport for each of the planned flights; and
 estimating the remaining service life of the consumable aircraft component, based on the received wear data and the received flight schedule data.

\* \* \* \* \*